(No Model.)
J. A. HAGAN, Dec'd.
J. F. Thoms, Administrator.
CAR WHEEL.
No. 332,119. Patented Dec. 8, 1885.
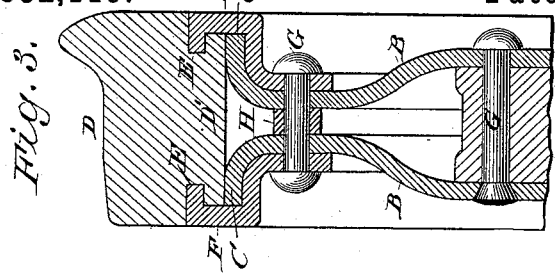
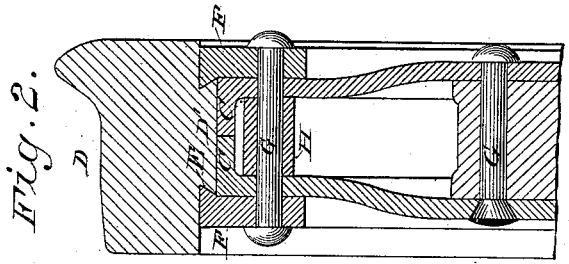
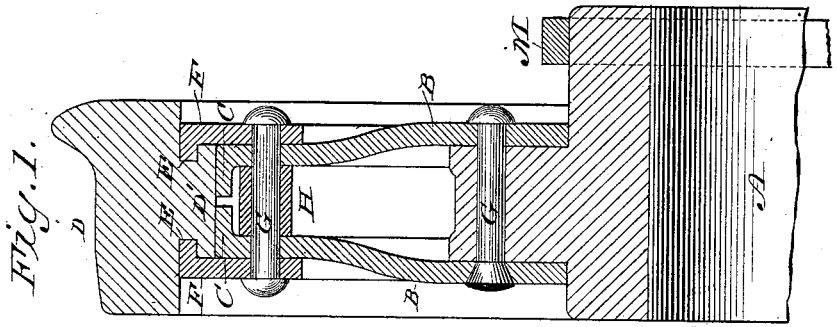
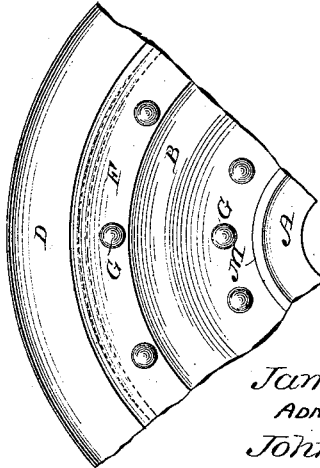
WITNESSES
Ed. A. Newman
Al. C. Newman
James F. Thoms
ADM'R OF ESTATE OF
John A. Hagan
INVENTOR DECEASED,
By Attorneys
Baldwin, Hopkins, & Peyton

UNITED STATES PATENT OFFICE.

JAMES F. THOMS, OF THREE RIVERS, MICHIGAN, (ADMINISTRATOR OF JOHN A. HAGAN, DECEASED,) ASSIGNOR TO THE SHEFFIELD VELOCIPEDE CAR COMPANY, OF SAME PLACE.

CAR-WHEEL.

SPECIFICATION forming part of Letters Patent No. 332,119, dated December 8, 1885.

Application filed May 6, 1885. Serial No. 164,593. (No model.)

*To all whom it may concern:*

Be it known that JOHN A. HAGAN, late of Three Rivers, in the county of St. Joseph and State of Michigan, did in his life-time invent a certain Improved Construction of Composite Car-Wheel, of which the following is a specification, reference being had to the accompanying drawings, in which—

Figure 1 is a radial section of a car-wheel embodying the invention. Figs. 2 and 3 are formal modifications of the same, and Fig. 4 is a side view of a segment of the wheel.

The invention relates to car-wheels of the same general kind for which the said John A. Hagan has heretofore been granted United States Patents Nos. 294,995, 294,996, and 294,997; and it consists in the particulars of construction and organization of parts designed to comprehend all of the practical advantages of the said patented car-wheels, and at the same time to secure greater simplicity and economy of construction.

The invention is more particularly an improvement upon the patented car-wheel shown in said Patent No. 294,997, and relates particularly to the manner of seating and connecting the tire to the wheel-body.

Referring to the letters upon the drawings, A indicates the hub; B, the disks, preferably dished in any ordinary manner—as, for example, in the said patents—and forming the wheel-body. These disks are flanged, as at C C, to form a seat for the tire, upon the same principle as set forth in the said patents.

D indicates the tire, having an annular inward projection, D', formed, preferably, by cutting away two annular grooves, E E, upon either side of the inner face of the tire. These grooves are of dovetail or equivalent form in section, as illustrated.

F F indicate clamping-rings, which are adapted to fit into the annular grooves in the edges of the inner surface of the tire, and to interlock or engage with the inward annular projection of the tire, and to clamp the disks forming the car-wheel body, and thus firmly unite the tire to the body of the wheel.

G G are ordinary bolts for securing the parts together, as will be understood from the drawings, and H is a sleeve or distance-piece that may be used, if desired.

The manner of manufacturing the improved wheel is as follows: The hub may be a forging or a casting of steel or strong cast-iron. The latter is the cheaper metal, and may be made amply strong. The heavy forged band shown at M is added to prevent cracking the hub should the wheel be fitted too tightly on the axle, but is not claimed as novel. The hub is bored for the axle, and the outside and the sides of the annular projection are turned, so as to insure the side plates fitting accurately, and the rivet-holes are bored. The side plates are by preference formed of flanged and bent or dished steel plates, and as rolled plates are of a uniform thickness, the completed wheel is balanced. They may, however, be made of steel castings or of other suitable metal. The rivet-holes, which coincide with those in the wheel-hub, are bored to insure their being true, and the outside and edges of the flanged rims are made true by turning or otherwise, and the outer rivet-holes formed in the disks and clamping-rings, the distance from the edge of the flanges to the inner face of the plates being made uniform. If suitable appliances are used for flanging the plates, the outside of the flanges which form the tire-seat can be made so nearly true that very little further finishing is required. The distance-pieces, by preference, are short pieces of gas-pipe or similar tube. The tire is formed by casting, forging, or rolling in any usual manner, and its inner face, with the annular grooves therein or in its edges, is made true by turning or otherwise.

In completing the improved wheel, after the different parts have been finished as described, including the drilling of the rivet-holes, the side plates are first slightly heated, which allows them to be easily put in place on the hub, and one is first put on and allowed to cool in place. Temporary pins are then put through the outer holes in this plate, on which are placed the distance-pieces. The second side plate is then put on the hub, the temporary pins serving as guides to get the holes opposite, as well as retaining the distance-pieces in place. The plates may now be riveted to the hub. The tire is put on the wheel-body either by hydraulic pressure or by heating it sufficiently so as to allow it to be easily put on. The rings are then pressed into place, when the outer row of rivets may be put in, each temporary pin being driven out as a rivet is put in, so that the distance-pieces cannot get out of place. The hub-band may be shrunk on either before or after the tire is put in place, which completes the wheel.

It is conceded that a tire with an inward annular projection is not new, that clamping-rings such as here shown are not new, and that flanged disks are not new, and none of these elements of the organization are claimed *per se;* but What is believed to be new and useful, and is sought to be secured by Letters Patent of the United States, is—

1. In a car-wheel, the combination, with the hub A and the flanged disks B B, of the tire D, having cylindrical offsets or annular grooves E E at the outer portions of the inner surface, forming shoulders, the rings F F, fitting into such shoulders, and the rivets or bolts connecting the parts, substantially as set forth.

2. In a car-wheel, the combination, with the hub and disks B, having inwardly-turned flanges, of a tire, D, having cylindrical offsets or annular grooves E E at the outer portions of the inner surface, and undercut shoulders, and the dovetailed rings fitting such shoulders, and the rivets or bolts G, connecting the respective parts, substantially as set forth.

In testimony whereof I have hereunto subscribed my name.

JAMES F. THOMS,
*Administrator of the estate of John A. Hagan, deceased.*

Witnesses:
ELEANOR THOMS,
PEARLE E. THOMS.